(12) United States Patent
Chen et al.

(10) Patent No.: US 7,714,529 B2
(45) Date of Patent: May 11, 2010

(54) PERMANENT MAGNET SYNCHRONOUS MOTOR AND CONTROLLER THEREFOR

(75) Inventors: Xiaojiang Chen, Ringmer (GB); Adam Pride, Portslade (GB); Shinichiro Iwasaki, Hove (GB)

(73) Assignee: Aisin Seiki Kabushiki Kaisha, Aichi-ken (JP)

( * ) Notice: Subject to any disclaimer, the term of this patent is extended or adjusted under 35 U.S.C. 154(b) by 1252 days.

(21) Appl. No.: 11/120,960

(22) Filed: May 4, 2005

(65) Prior Publication Data

US 2005/0248306 A1    Nov. 10, 2005

(30) Foreign Application Priority Data

May 5, 2004    (GB) .................................. 0410037.6

(51) Int. Cl.
*H02P 3/18*    (2006.01)
*H02P 6/00*    (2006.01)

(52) U.S. Cl. .................... 318/712; 318/400.38; 318/722

(58) Field of Classification Search ................. 318/712, 318/400.38, 722

See application file for complete search history.

(56) References Cited

U.S. PATENT DOCUMENTS

| | | | | |
|---|---|---|---|---|
| 3,942,084 A * | 3/1976 | Louth | ..................... | 318/400.17 |
| 4,472,665 A | 9/1984 | Tanikoshi | | |
| 6,489,761 B1 * | 12/2002 | Schroeder et al. | ...... | 324/207.25 |
| 6,522,130 B1 * | 2/2003 | Lutz | .......................... | 324/207.2 |
| 7,114,933 B2 * | 10/2006 | Adachi et al. | .................. | 425/3 |
| 7,174,795 B2 * | 2/2007 | Feng et al. | ............. | 73/862.332 |

FOREIGN PATENT DOCUMENTS

GB    2070354 A    9/1981

OTHER PUBLICATIONS

Emura T., Wang L., Yamanaka M., and Nakamura H.. "a High-Precision Positioning Servo Controller Based on Phase/Frequency Deteching Technique of Two-Phase-Type PLL", IEEE Transactions on Industrial Applications, vol. 47, No. 6, pp. 1298-1306, Dec. 2000.

(Continued)

*Primary Examiner*—Bentsu Ro
*Assistant Examiner*—Erick Glass
(74) *Attorney, Agent, or Firm*—Sughrue Mion, PLLC

(57) ABSTRACT

A low-cost sine-wave drive for a 3-phase permanent magnet synchronous AC machines (PMSM) in open-loop control is based on the measurements of two linear Hall sensors. The two Hall sensors are excited by a magnetic ring with the same pole number as the PMSM rotor magnet and sinusoidal flux distributions. The output signals of the Hall sensors are unified through a two-phase-type phase-lock-loop in order to reduce the impact of the sensor mounting non-uniformity during mass production. The peak torque and speed of motor is simply controlled by adjusting the amplitude of pulse-width-modulation carrier. Smooth torque control is achieved due to sinusoidal 3-phase currents. Such a simple sine-wave drive can be achieved with or without the assistance of a micro-controller unit (MCU). No current sensor is required for the motor phase current detection. This motor can be used in industrial applications where there is no strict requirement on torque response and constant speed control of PMSM machines.

17 Claims, 8 Drawing Sheets

OTHER PUBLICATIONS

F. Carichi, F.G. Capponi, F. Crescimbini and L. Solero, "Sinusoidal Brushless Drive with Low-Cost Linear Hall Effect Position Sensors", IEEE PESC'01, $32^{nd}$ Annual Power Electronics Specialists Conference, Piscataway, NJ, USA; pp. 799-804, 2001.

* cited by examiner

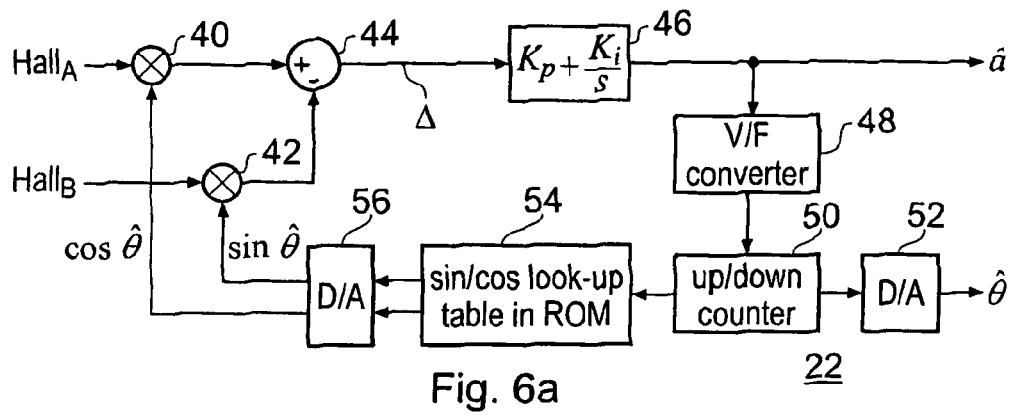
Fig. 6a
$$\begin{cases} \Delta^k = \text{Hall}_A^k \cos \hat{\theta}^k - \text{Hall}_B^k \sin \hat{\theta}^k \\ \hat{\theta}^{k+1} = \hat{\theta}^k + T_s \cdot \hat{\omega}^k + K_p \Delta^k, \qquad \hat{\theta} \in [0, 2\pi] \\ \hat{\omega}^{k+1} = \hat{\omega}^k + T_s K_i \Delta^k \end{cases}$$
Fig. 6b
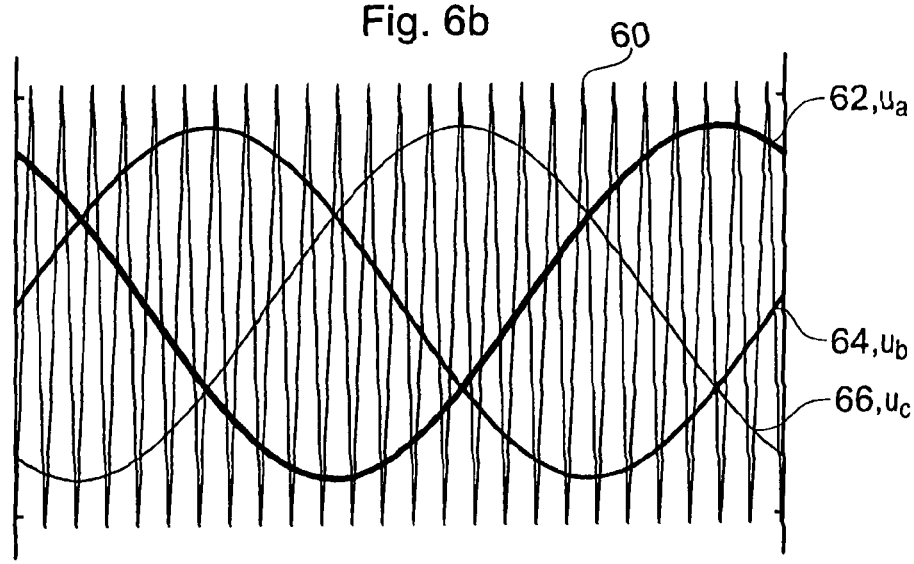
Fig. 7a
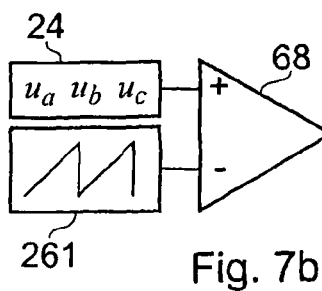
Fig. 7b
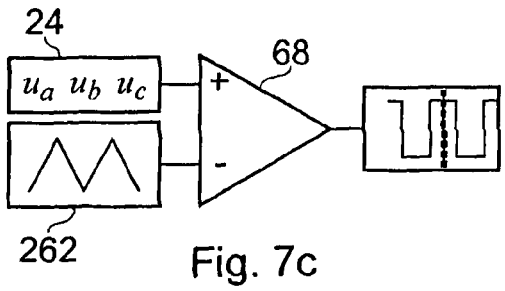
Fig. 7c

PERMANENT MAGNET SYNCHRONOUS MOTOR AND CONTROLLER THEREFOR

CROSS REFERENCE TO RELATED APPLICATIONS

This application is based on and claims priority under 35 U.S.C. §119 with respect to Great Britain Patent Application 0410037.6, filed on May 5, 2004, the entire content of which is incorporated herein by reference.

FIELD OF THE INVENTION

The present invention relates to a permanent magnet synchronous motor having a controller. The present invention also relates to a controller for such a motor.

BACKGROUND

The sinusoidal control of AC machines is commonly achieved by using the well-known vector control (also called field-orientated control) theory. It has been widely used for variable speed control of 3-phase asynchronous induction motors and synchronous PM AC machines. It delivers sinusoidal control of 3-phase current of AC motors with low torque ripple. Due to the involvement of extensive computation, a high-speed micro-controller, DSP or microprocessor (MCU) is usually required. Accurate rotor position information is essential for achieving high-performance vector control. However, high-resolution position sensors are usually fragile, unreliable and expensive. Therefore the development of position-sensorless sinusoidal control is driven by eliminating the cost and reliability problem caused by high-resolution position sensors. Position sensorless AC control is preferred for many industrial applications. Unfortunately accurate position determination is extremely difficult at start-up and very low speed due to the lack of position-dependent signals. Also, a high-performance MCU is required for sensorless methods due to the implementation of complex algorithms as well.

Low-cost switching-type Hall sensors are commonly employed to generate the commutation signals for controlling brushless DC motors in conventional six-step square-wave drives. They have also been proposed for a low-cost sine-wave drive. However, due to their rough position measurement, smooth torque control for PMSM at very low speed is not achievable.

Alternatively linear Hall sensors can provide more accurate position measurement continuously. Linear Hall sensors are widely utilised for measuring magnetic field strength. U.S. Pat. No. 6,522,130 proposes mounting a ring magnet on a rotor with two linear Hall sensor fixed on the stator with a phase displacement with 90 electrical degrees. The sine/cosine signal outputs from the two Hall sensors can be directly used to decode rotor position by using the well-known resolver-to-digital (RD) conversion as the process for resolver. Therefore, accurate and low-cost position determination is achievable if the magnetic flux distribution of ring magnet is sinusoidal. As a result, a sine-wave drive based on vector control theory can be implemented with a relatively low-cost solution.

All the sine-wave control strategies mentioned above can achieve the rapid and smooth torque control of AC machines by using a high-performance MCU. They are suitable for the high-performance servo systems. However, for some industrial applications, strictly rapid torque response is not necessary and only the torque smoothness of PMSM motor is the main concern. Furthermore the cost for high-performance MCU is intolerable in these applications. Therefore a sine-wave drive with even less cost is preferred.

A low-cost open-loop sine-wave solution for AC induction asynchronous motors can be implemented by well-known V/F (Voltage/Frequency) control without requiring position sensors and current sensor as well. Only low-end MCU or no MCU is required in these low-cost low-performance AC drives. The rotor magnetic field of the induction motors is induced due to the slip of rotor frequency and stator current synchronous frequency. The torque is generated by the interaction of the induced field in rotor and stator control flux. However, PMSM machines have no such feature. The rotor position of a PMSM has to be referred to for proper control of 3-phase stator currents in order to synchronise with the rotating magnetic field on the rotor of PMSM. Therefore simply applying the conventional V/F signal into the stator winding of PMSM is unable to guarantee the proper operation of a PMSM.

Emura T., Wang L., Yamanaka M., and Nakamura H., "A High-Precision Positioning Servo Controller Based on Phase/Frequency Detecting Technique of Two-Phase-Type PLL", *IEEE Transactions on Industrial Applications*, VOL. 47, NO. 6, pp 1298-1306, December 2000 propose the use of a Two-Phase-Type PLL in the high precision servo control of motor used in a gear grinding machine.

The present invention seeks to provide a controller for a PMSM which can be implemented at low cost and operate as an open loop controller (or in a closed loop control system).

SUMMARY OF THE INVENTION

According to one aspect of the present invention, there is provided a permanent magnet synchronous motor having a stator and a rotor, the stator having windings and the rotor comprising a plurality of permanent magnets and a controller, wherein the controller comprises:

two magnetic field sensors, each having a linear response to sensed magnetic field strength, the sensors being spaced by an angle A electrical degrees relative to the rotor, where angle A is greater than 0 degrees and less than 180 degrees or greater than 180 degrees and less then 360 degrees, for sensing the position of the rotor by sensing a magnetic field representative of the fields of the magnets of the rotor;

means for producing first and second signals representing normalised orthogonal components of the outputs of the sensors; and energising means for producing, from the said orthogonal components, sinusoidal currents for energising the windings of the stator to drive the rotor.

The magnetic field sensors are preferably Hall effect sensors but other suitable sensors may be used. The following description refers to Hall sensors by way of example.

An embodiment of the invention relates to the sinusoidal control of a 3-phase permanent magnet synchronous AC motor (PMSM) based on the sine/cosine measurements of two linear Hall sensors, particularly regarding a low-cost open-loop PMSM sine-wave drive with low-torque ripple for PMSM motors without the phase current detection.

In a currently preferred embodiment the controller is a low-cost open-loop sinusoidal controller. It comprises that two linear Hall sensors fixed on the motor stator with an optimal phase displacement in 90 electric degree to detect the rotor magnetic field. An extra ring magnet with sinusoidal flux distribution and the same pole number as the controlled PMSM rotor magnet is fixed on the rotor to excite the Hall sensors. A two-phase-type phase-lock-loop (TP-PLL) is employed to normalise the Hall sensor sine/cosine signals. The normalised sine/cosine signals are subsequently transformed into 3-phase synchronous sinusoidal voltage waveforms as the inputs to pulse-width-modulator (PWM). The amplitude of the 3-phase sine-waves is normalised with a fixed voltage level. The amplitude of the PWM carrier signal is made adjustable to control the PWM average output in order to limit the phase peak current, peak output torque and peak speed. Finally 3-phase PWM output logic signals are fed into a conventional 3-phase inverter which provides power amplification. No current measurement is involved in this simple open-loop control.

The excitation ring magnet is mounted on the rotor of PMSM. It has exactly the same number of poles as the rotor magnet, and it has a sinusoidal-flux distribution. Its magnetic field is preferably aligned with the PMSM rotor magnetic field in order to simply the system design. Two linear Hall sensors are mounted on the stator to detect the magnetic field of the ring magnet. The Hall sensors preferably have a 90-electrical-degree displacement angle. The two Hall sensors should be mounted at a distance from the excitation ring which avoids saturation of the Hall sensor outputs. The outputs of these two Hall sensors can be defined as:

$$\text{Hall}_A = G_A(t)\sin\theta \quad \text{Hall}_B = G_B(t)\cos(\theta+\Delta\theta) \qquad (1\text{-a}, 1\text{-b})$$

Ideally the output gain $G_A(t)$ and $G_B(t)$ are expected to be $G_A(t)=G_B(t)=$constant. In practice, due to the non-ideal mechanical installation, uneven magnetic field distribution, and non-uniform mounting distance between the Hall sensor and ring magnet, eventually the amplitude of sine/cosine signals from the two linear Hall sensors will deviate from their specified voltage levels. If the distorted sine/cosine signals are directly employed for open-loop control, non-uniform control and serious torque ripple will be caused. We have found that the normalisation (also referred to as unification) operation of the Hall sensor signals dramatically reduces the impact on torque ripple of deteriorated signals from the Hall sensors and results in much smoother torque control of the PMSM motor.

The normalisation procedure can be achieved by using:

$$\text{Hall}_{A\text{-}norm} = \frac{\text{Hall}_A}{\sqrt{\text{Hall}_A^2 + \text{Hall}_B^2}} \qquad (2\text{-a})$$

$$\text{Hall}_{B\text{-}norm} = \frac{\text{Hall}_B}{\sqrt{\text{Hall}_A^2 + \text{Hall}_B^2}} \qquad (2\text{-b})$$

It may be difficult to implement Equation 2 by either software or hardware. For the currently preferred low-cost applications, we prefer to employ a two-phase-type phase-lock-loop (TP-PLL) to fulfil this task without much computation effort by MCU software design or by low-cost hardware implementation solution. Actually the TP-PLL accomplishes the low-pass filtering and normalisation of sine/cosine input signals, which is our main concern here. In additional such a PLL provides the motor speed and position measurements continuously which may be used in a simple 2nd-order feedback loop. The stabilisation of TP-PLL can be easily achieved by adjusting the proportional-integral (PI) gains.

Thereafter the unified Hall sensor sine/cosine signals are transformed into 3-phase synchronous sinusoidal waveforms by the well-known Clark Transformation as follows:

$$\begin{bmatrix} a \\ b \\ c \end{bmatrix} = \begin{bmatrix} 1 & 0 \\ -\frac{1}{2} & \frac{\sqrt{3}}{2} \\ -\frac{1}{2} & -\frac{\sqrt{3}}{2} \end{bmatrix} \begin{bmatrix} \alpha \\ \beta \end{bmatrix} \qquad (3)$$

The function of the Clark Transformation in Equation (3) can be implemented by either hardware or software without difficulty. The amplitude of the 3-phase sinusoidal signals will be unity because they have been normalised. They are the inputs fed into PWM choppers. In the conventional PWM control, the amplitude of the high-frequency triangle carrier of PWM is fixed, and controlling the average output of PWM is accomplished by adjusting the amplitudes of 3-phase sinusoidal inputs simultaneously. However in an open loop low cost controller according to an embodiment of the invention, 3-phase sinusoidal input signals are maintained with a fixed unity amplitude and the required 3-phase PWM output level is achieved by adjusting the amplitude of the high-frequency carrier signal manually. With such a design, the 3-phase sinusoidal PWM control circuits are greatly simplified.

The 3-phase PWM logic signals are finally fed to gate drivers for controlling the switching power devices of a 3-phase inverter. The output of the inverter provides the sinusoidal control of 3-phase current of PMSM machines. There is no stringent need for detecting the stator phase to achieve this low cost open loop sine wave controller. Normally, the high performance sine wave control of a 3-phase PMSM fully relies on the accurate measurements of at least 2-phase currents and rotor position in order to control the d-q axis currents independently and fulfil the complicated field orient control algorithm of a PMSM machine. Closed loop control of 3-phase currents would be essential in such a high-end controller. The current sensor cost for a vector control based PMSM drive is usually high. However for the low cost sine wave drive proposed here of an embodiment of the invention, there is no direct closed loop feedback control of 3 phase currents to reduce system cost. Only rough measurement of the inverter DC-link current may be employed for the purpose of short circuit protection and peak current limitation to the motor and inverter. The peak phase current, peak output torque and peak speed of the PMSM machine can be controlled by adjusting the amplitude level of the PWM carrier manually.

Another aspect of the invention provides a controller for use with a permanent magnet synchronous motor having a stator and a rotor, the stator having windings and the rotor comprising a plurality of permanent magnets; the controller comprising;

inputs for connection to two magnetic field sensors, each having a linear response to sensed magnetic field strength, the sensors being spaced by an angle A electrical degrees relative to the rotor, where angle A is greater than 0 degrees and less than 180 degrees or greater than 180 degrees and less then 360 degrees, for sensing the position of the rotor by sensing a magnetic field representative of the fields of the magnets of the rotor;

means for producing first and second signals representing normalised orthogonal components of the outputs of the sensors; and energising means for producing, from the said orthogonal components, pulse width modulated currents for application to an inverter for energising the windings of the stator to drive the rotor.

The invention also provides a computer program which when run on a suitable processor causes the processor to operate as the controller of said another aspect of the invention.

BRIEF DESCRIPTION OF THE DRAWINGS

For a better understanding of the present invention, reference will now be made by way of example to the accompanying drawings in which:

FIG. 6a is an example of a TP-PLL and FIG. 6b is a TP-PLL algorithm;

FIG. 7 illustrates PWM chopping basics and PWM asymmetric/symmetric PWM comparators;

DETAILED DESCRIPTION

Figure 1:
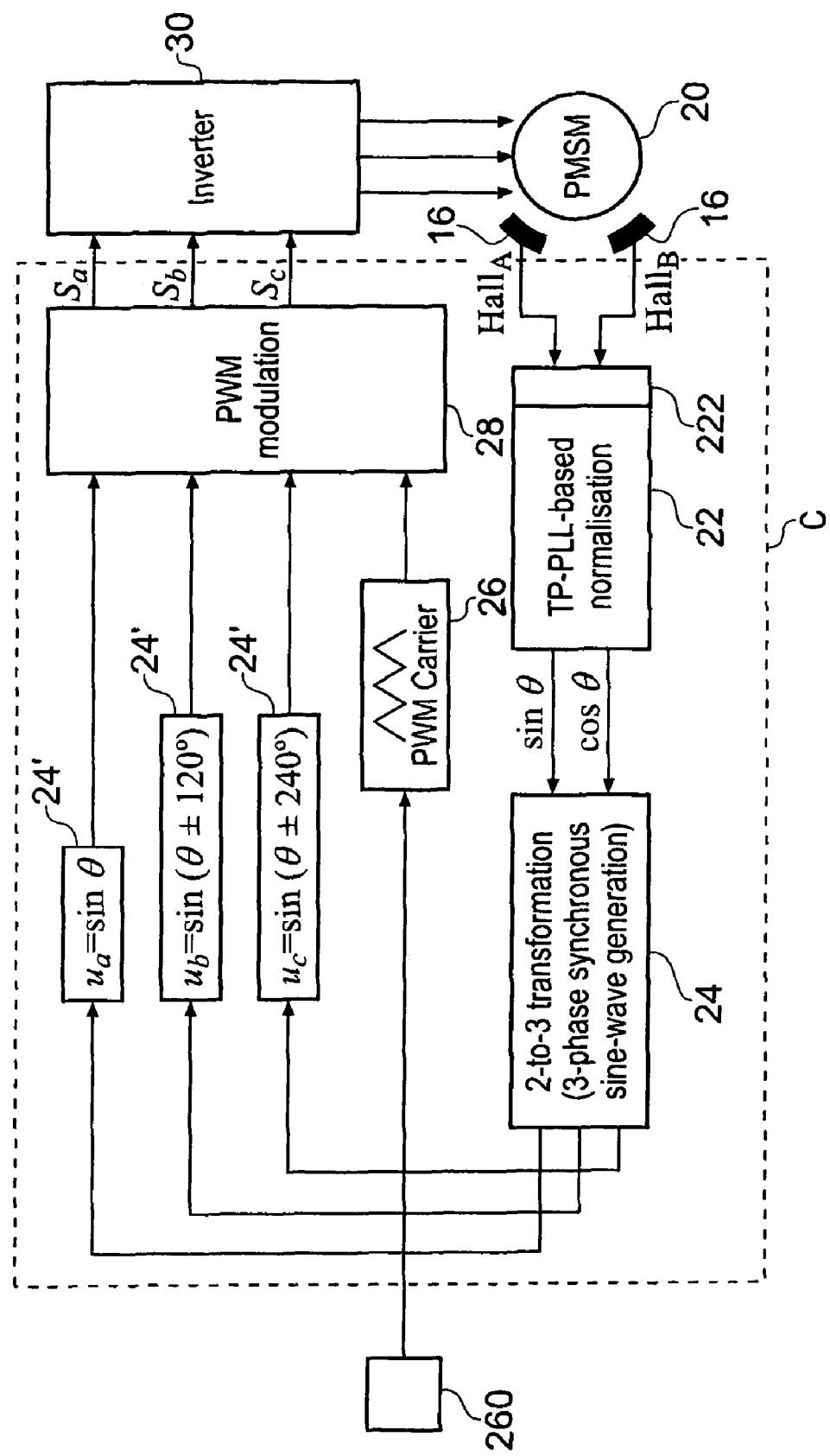
FIG. 1 is a schematic diagram of an open-loop sine-wave drive, according to an embodiment of the invention, based on the output signals of two linear Hall sensors normalised by a Two Phase-Phase Locked Loop (TP-PLL)

FIG. 1 is a schematic diagram of an open-loop sine-wave drive according to an embodiment of the invention, comprising a PMSM 20 and an open loop controller. The controller comprises two Hall effect sensors 16 (HallA and HallB) which have a linear response to sensed magnetic field strength. In this example the sensors 16 are spaced by 90 electrical degrees but may be at any other angle except 180n where n is an integer: n may be 0, 1, 2, etc. A Two Phase Phase Locked Loop TP-PLL 22 normalises the outputs of the two Hall sensors 16 and provides normalised outputs sin θ and cos θ. A 2-to-3 Clark transformation function block 24 converts the two phases sin θ and cos θ, to three phases $u_a$, $u_b$ and $u_c$ as indicated at 24'. A PWM chopper 28 modulates a triangular carrier produced by a carrier source 26 to output pulse width modulated phases Sa, Sb and Sc. An inverter 30 converts the PWM phases Sa, Sb and Sc to sinusoidal currents which energise the 3 phase stator of the PMSM 20. In accordance with an embodiment of the invention, the amplitude of the carrier is adjustable by a control 260. Adjusting the carrier amplitude allows simple adjustment of all three phases $u_a$, $u_b$ and $u_c$ together avoiding the need to provide three amplitude adjusters for the respective phases. In this example the amplitude adjustment is a manual adjustment via the controller 260.

Figure 2A:
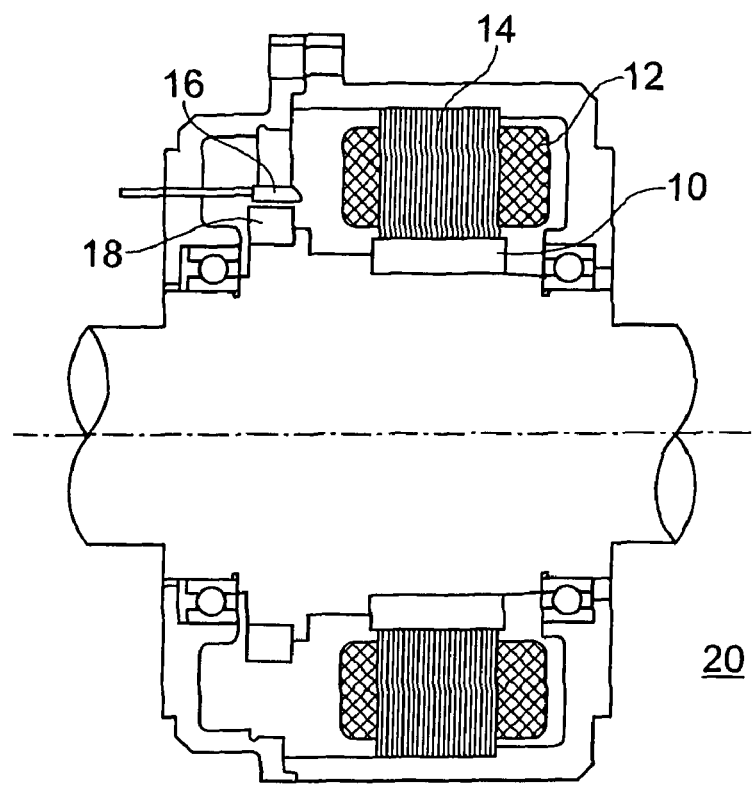
FIGS. 2a and b are cross-sectional views of a 3-phase PMSM motor with 12 poles and sinusoidal flux density in air gap, and showing an example of the mounting location of linear Hall sensors.
Figure 2B:
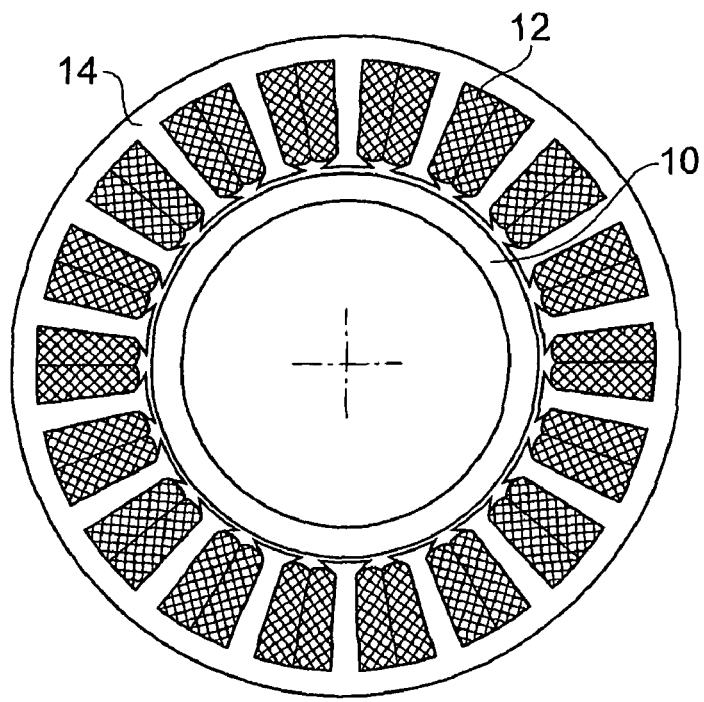

The PMSM motor is illustrated in FIG. 2. The motor comprises a rotor with a surfaced mounted 12-pole permanent ring magnet 10, a stator 14 of steel laminations having 18 slots for coil windings 12, two linear Hall sensors 16 fixed on the stator with the displacement of 90 electric degrees, and an excitation ring magnet 18 fixed to the rotor. The ring has 12 poles having the same sinusoidal flux distribution as the rotor. In this example the poles of the excitation ring are aligned with those of the rotor to simplify signal processing. The Hall sensors 16 on stator, and excitation ring magnet 18 on rotor, are mounted at a distance from the stator windings in order to minimise the armature effect due to the stator current. That is they are spaced from the stator so the magnetic fields generated in the stator do not interfere with the Hall sensors and the excitation ring.

Figure 3:
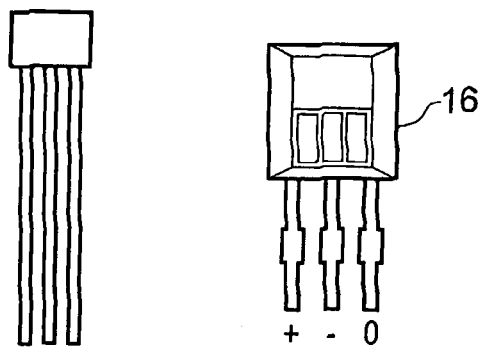
FIG. 3 illustrates a Honeywell linear Hall sensor SS495A used in an embodiment of the invention.

In an example Honeywell linear Hall sensors SS495A are used. Such a sensor is illustrated in FIG. 3.

Figure 4A:
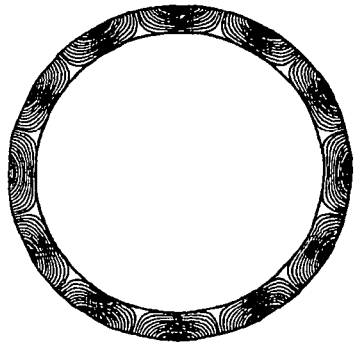
FIGS. 4a and b show an example of a 12-pole permanent magnet ring used for the excitation of two linear Hall sensors and its sinusoidal flux distribution pattern.
Figure 4B:
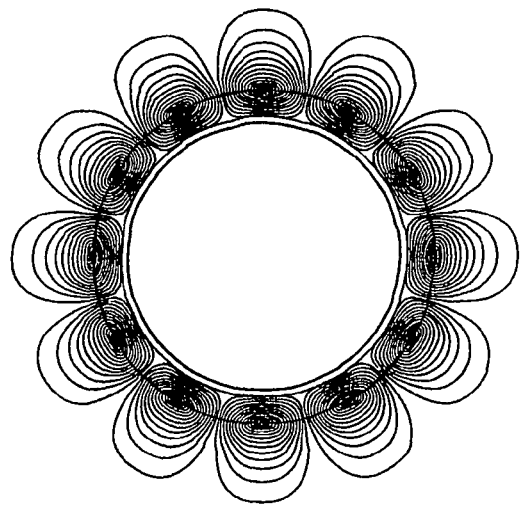
Figures 5A, 5B:
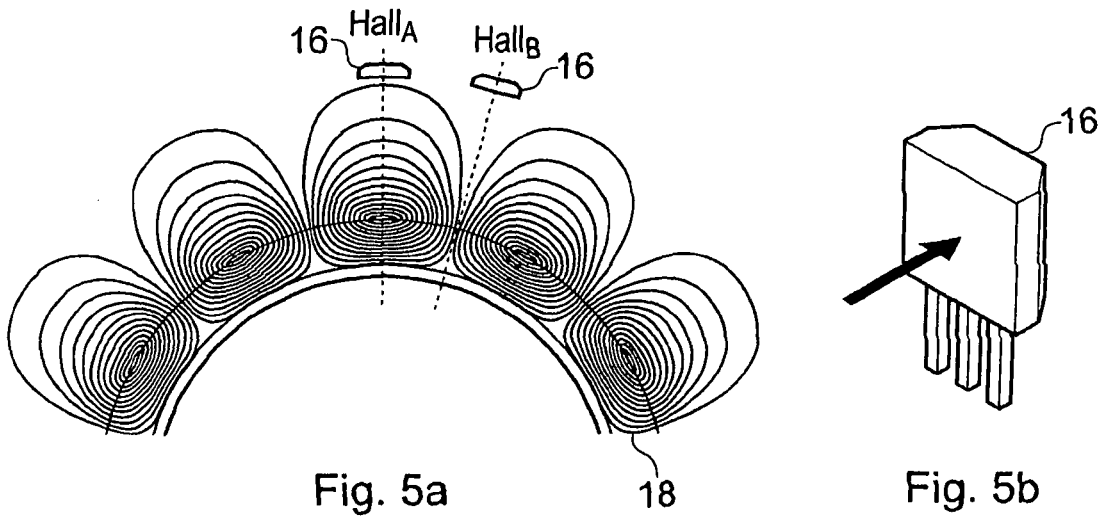
FIG. 5 shows the positions of two linear Hall sensors with respect to the flux direction of the excitation ring magnet.

The excitation ring magnet 18 has a 12-pole sinusoidal flux distribution. The flux pattern of the excitation ring is illustrated in FIG. 4. Correspondingly, FIG. 5 shows the mounting location of two linear hall sensors with respect to the excitation magnetic flux. The two Hall sensors 16 are mounted at the same distance from the ring magnet 18. The phase displacement angle for two linear sensors is in 90 electric-degrees. The radial direction of the ring magnet should be vertical to the flat surface of the Hall sensors in order to get the optimal detection of the magnetic field. Due to the TP-PLL-based unification process for the sine/cosine signals from the linear Hall sensors, a precise mounting distance between the Hall sensors and excitation ring magnet is not required. The only strict restriction on this mounting distance is to avoid any linear-Hall-sensor output saturation happening for a whole mechanical cycle rotation of the excitation ring magnet.

FIG. 6 illustrates two implementation solutions of the TP-PLL 22. A circuit hardware solution of TP-PLL is shown in FIG. 6(a). The TP-PLL 22 comprises a standard proportional-integral (PI) controller 46, a voltage/frequency (V/F) converter 48, an up/down counter 50, a sine/cosine lookup table ROM 54, and a digital-to-analogue (D/A) converter 56. The feedback components sin θ and cos θ represents the unified results of the Hall sensor outputs $Hall_A$ and $Hall_B$. This feedback loop can also provide measurements θ and ω for the motor position and speed respectively if required as discussed below with reference to FIG. 13. The two phases sin θ and cos θ are supplied to multipliers 42 and 40 respectively. The outputs of the multipliers 42 and 409 are supplied to a differencing circuit 44 the output Δ of which is applied to the controller 46 of the TP-PLL 22. $\Delta = Hall_A \cos \theta - Hall_B \sin \theta$.

Another embodiment of the TP-PLL implements the equations of FIG. 6(b). digitally with an MCU. The unified sine/cosine signals $\sin \theta^K$ and $\cos \theta^K$ at each sampling interval K are interpolated numerically from a sine-wave look-up table based on the calculated cyclic position from the TP-PLL algorithm. In both solutions, the phase error is detected by ($Hall_A^K \cos \theta - Hall_B^K \sin \theta$.) The estimated position θ should be close to the rotor position θ when the phase lock is achieved in the feedback loop. Theoretically the Laplace transformation form of TP-PLL can be approximated as $$\hat{\theta}(s) \approx \frac{K_p s + K_i}{s^2 + K_p s + K_i} \theta(s) \tag{4}$$

Equation 4 stands for a standard 2-order control system. The stability of the loop will be fully governed by the PI gains Kp and Ki which can be easily adjusted to meet the desired performance, such as the response time, overshoot level, and final tracking phase error.

FIG. 7($a$) illustrates the relationship of the 3-phase sinusoidal waveforms 62, 64 and 66 (ua, ub uc) produced by the transformer 24 and the carrier signal 60 produced by the source 26. The 3-phase sinusoidal signals of normalised fixed amplitude are fed into PWM choppers 68 with the high-frequency carrier from source 261 or 262. The carrier amplitude is adjustable to get the desired PWM output level. Such a design results in the further simplification of the system circuit design. The carrier can be either an asymmetric (261) or symmetric (262) triangular waveform. The symmetric carrier is preferable due to its better control for electromagnetic-interference (EMI) noise.

Figure 8:
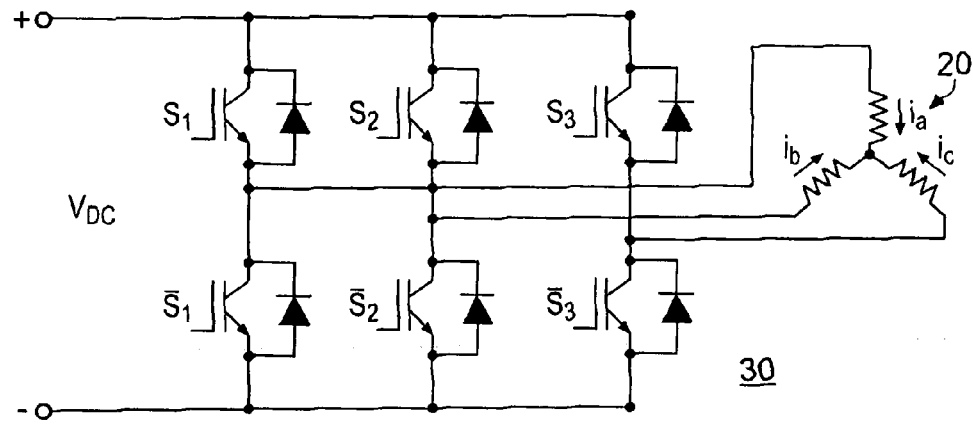
FIG. 8 illustrates a 3-phase inverter with the 3-phase PMSM in star connection.

The logic output signals Sa, Sb and Sc of the 3-phase PWM 28 are applied to gate drivers S1, S2 and S3 to control the upper-side power switches of the conventional 3-phase half-bridge DC-to-AC inverter, as shown in FIG. 8. The signals applied to the lower-side power switches are respectively complementary to those of the upper-side power switches. A certain amount of dead-time should be injected to avoid the short-circuit between the two power switches in each half-bridge of the inverter. The power switches may be IGBT or MOSFET depending on applications. The inverter output terminals are directly connected to the 3 phases of the stator of the PMSM 20. The connection of the motor can be in either star- or delta-connection. FIG. 8 shows a star configuration.

Figure 9A:
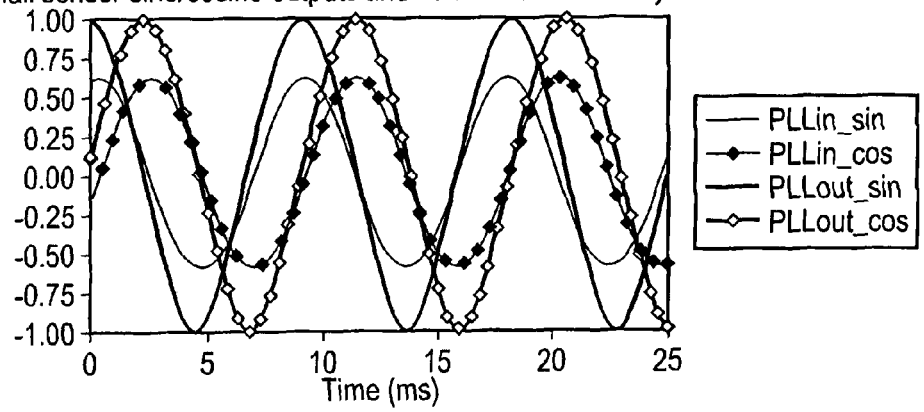
FIGS. 9a and b show Hall sensor output signals and outputs normalised by the TP-PLL.
Figure 9B:
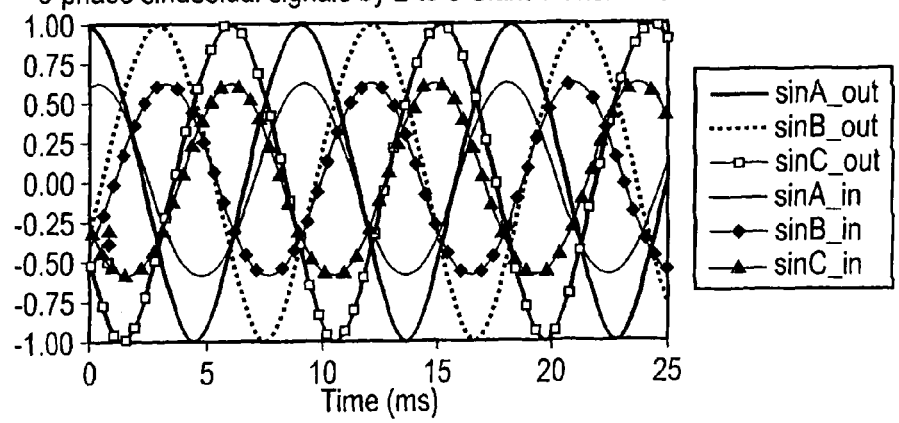

FIG. 9 shows practical test results for the unification of the two linear Hall sensor output signals by TP-PLL. As we can see from FIG. 9-$a$, due to the inexact mounting of the Hall sensors, the sine/cosine signals are distorted with amplitude variation and phase displacement angle error. After the unification process by TP-PLL, the distortions are reduced. The unity amplitude for the TP-PLL sine/cosine output signals are achieved no matter how much variation the Hall-sensor sine/cosine measurements have in amplitude. By employing the 2-to-3 Clark transformations to both the Hall sensor outputs and unified sine/cosine signal of TP-PLL, as shown in FIG. 9$b$, the 3-phase sinusoidal waveforms are dramatically improved after the TP-PLL unification. The unity amplitude is obtained in all 3 phases. Apparently if the original 3-phase sinusoidal signals without unification are directly inputted to the PWM modulator, it could cause the deteriorated torque control of the PMSM motor. On the other hand the mounting distance between the Hall sensors and the ring magnet and the magnetic strength of the excitation ring magnet is difficult to maintain constant during industrial mass production. If no unification is employed, a huge mount of labour and time would have to be spent adjusting some of circuit parameters in order to achieve the uniform control performance to meet the specification for the all the whole mass produced products and this would dramatically increase the system cost. Fortunately with the help of TP-PLL, all these cost and burdens can be substantially reduced if not totally eliminated Therefore the significance of the TP-PLL-based unification to Hall sensor signals is to maintain the uniform control for mass-production PMSM motors without any effort on adjusting the controller circuits.

Figure 10:
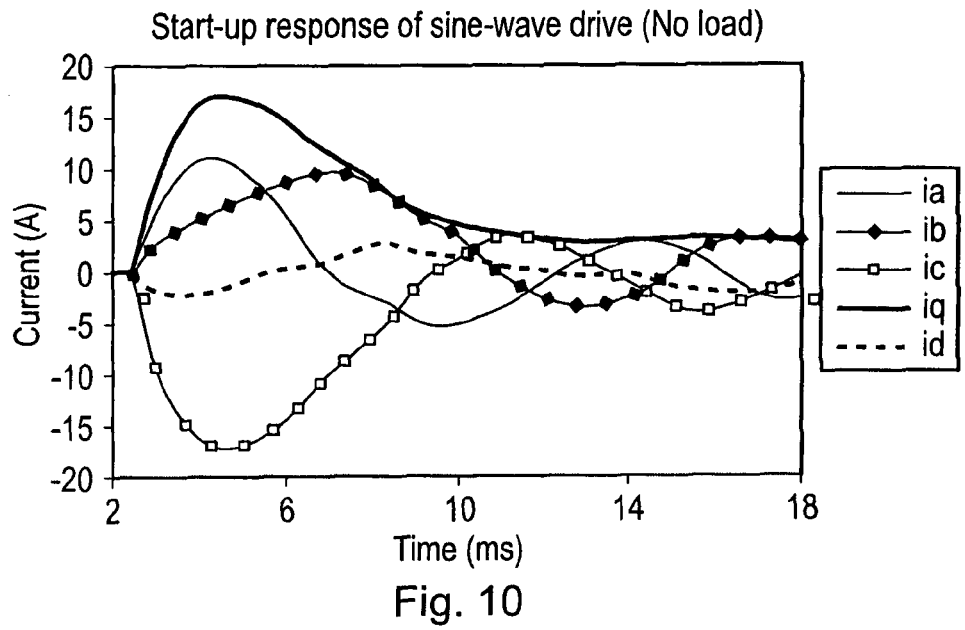
FIG. 10 is the start-up response of an open-loop sine-wave controller under no load.

FIG. 10 shows the start-up response of the open-loop sine-wave control in a no-load condition. The amplitude of the PWM carrier is fixed with a certain value. The dq-axis current components $i_d$ and $i_q$ are described in the rotor synchronous rotating co-ordinates. The q-axis current $i_q$ is proportional to the electromagnetic torque output for a surface-mounted PMSM machine in theory. The full torque can be achieved from standstill. As the back EMF gradually builds up with the increase of the motor speed, the motor current and torque output decrease steadily until a balanced peak speed is reached. The slight oscillation appears in the phase currents and output torque is dominantly caused by the inexact mounting of two Hall sensors.

Figure 11:
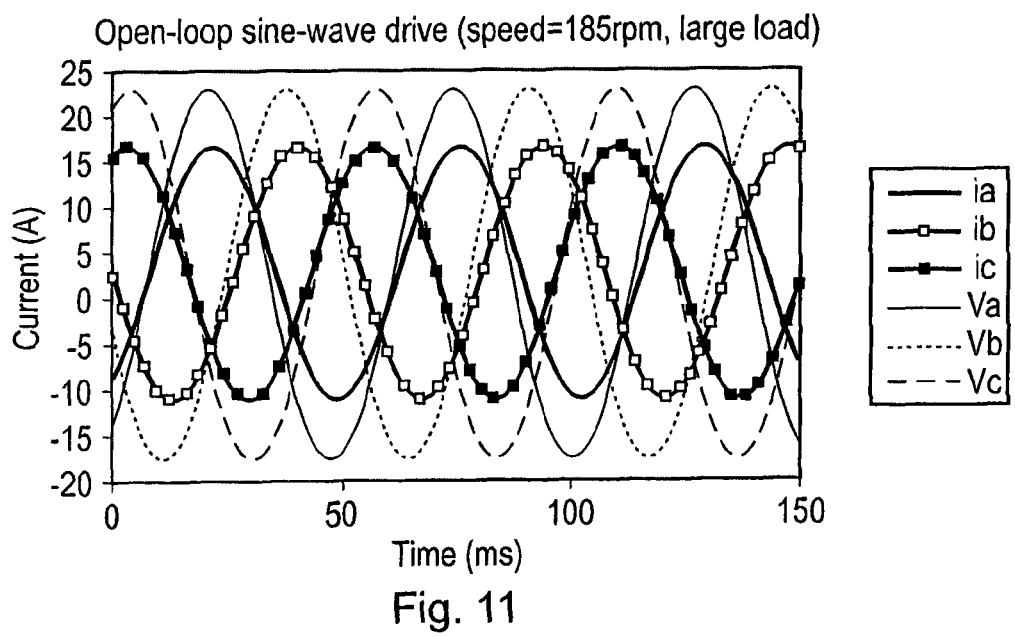
FIG. 11 shows test results of 3-phase current and voltage waveforms under open-loop control with a load.

A practical test result with load is illustrated in FIG. 11. The 3-phase line-to-neutral voltages are obtained through a low pass filter to eliminate the PWM carrier frequency. Basically the 3-phase voltages and currents are close to be sinusoidal. Once the load is applied, the motor automatically drops to a balanced speed from the peak speed. During the test the PMSM motor runs smoothly and silently. By adjusting the amplitude of the PWM carrier, a new speed will be reached to balance with the phase current and motor output torque. There is no closed-loop speed control offered in this simple controller.

Figure 12A:
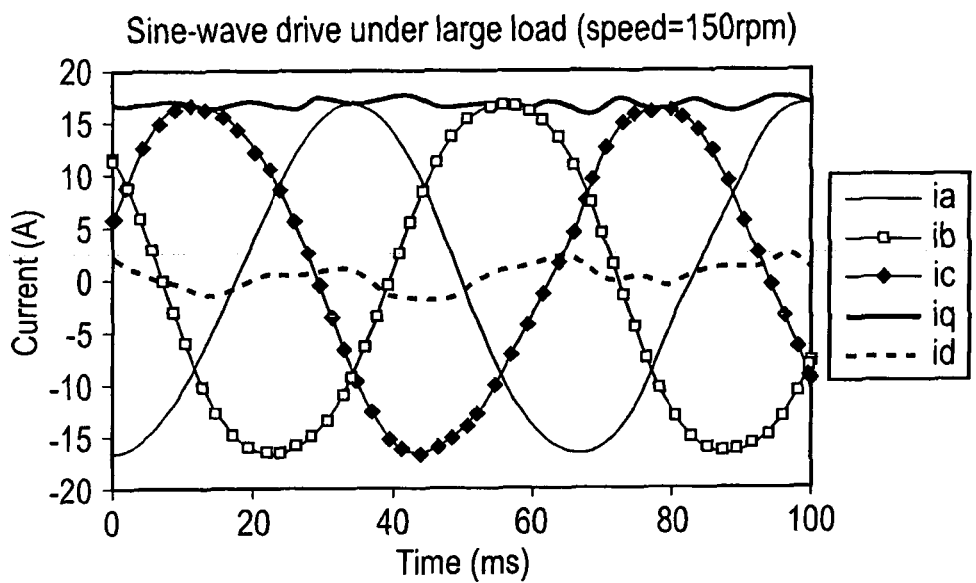
FIGS. 12a and b show a comparison of open-loop sine-wave and square-wave drive under a load.
Figure 12B:
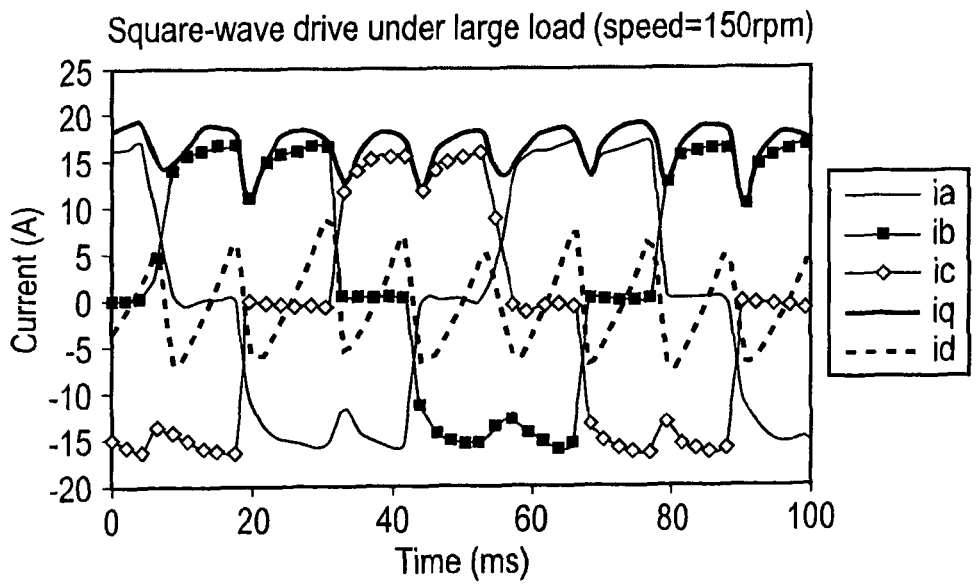

FIG. 12 illustrates the control-performance comparison between open-loop sine-wave drive and square-wave drive, i.e. conventional brushless DC (BLDC) six-step control. The commutation logic for the open-loop square-wave control is determined from the measurements of the two linear Hall sensors. Due to the uniform sinusoidal flux distribution of the ring magnet, only two linear Hall sensors are enough to provide the correct synchronous commutation signals. The full starting torque at standstill can be achieved in this square-wave drive as well. Comparatively in the conventional square-wave drive at least three switching-type Hall sensors are necessary to provide the non-hesitation start-up. Obviously the sine-wave drive offers much smooth torque control than the square-wave drive for controlling a PMSM machine. Due to the large variation in the torque-related q-axis current in the square-wave drive, the resulted mechanical vibration and noise are unavoidable. By improving the mounting of the Hall sensors, even smoother torque control can be achieved in open-loop sine-wave drive.

Figure 13:
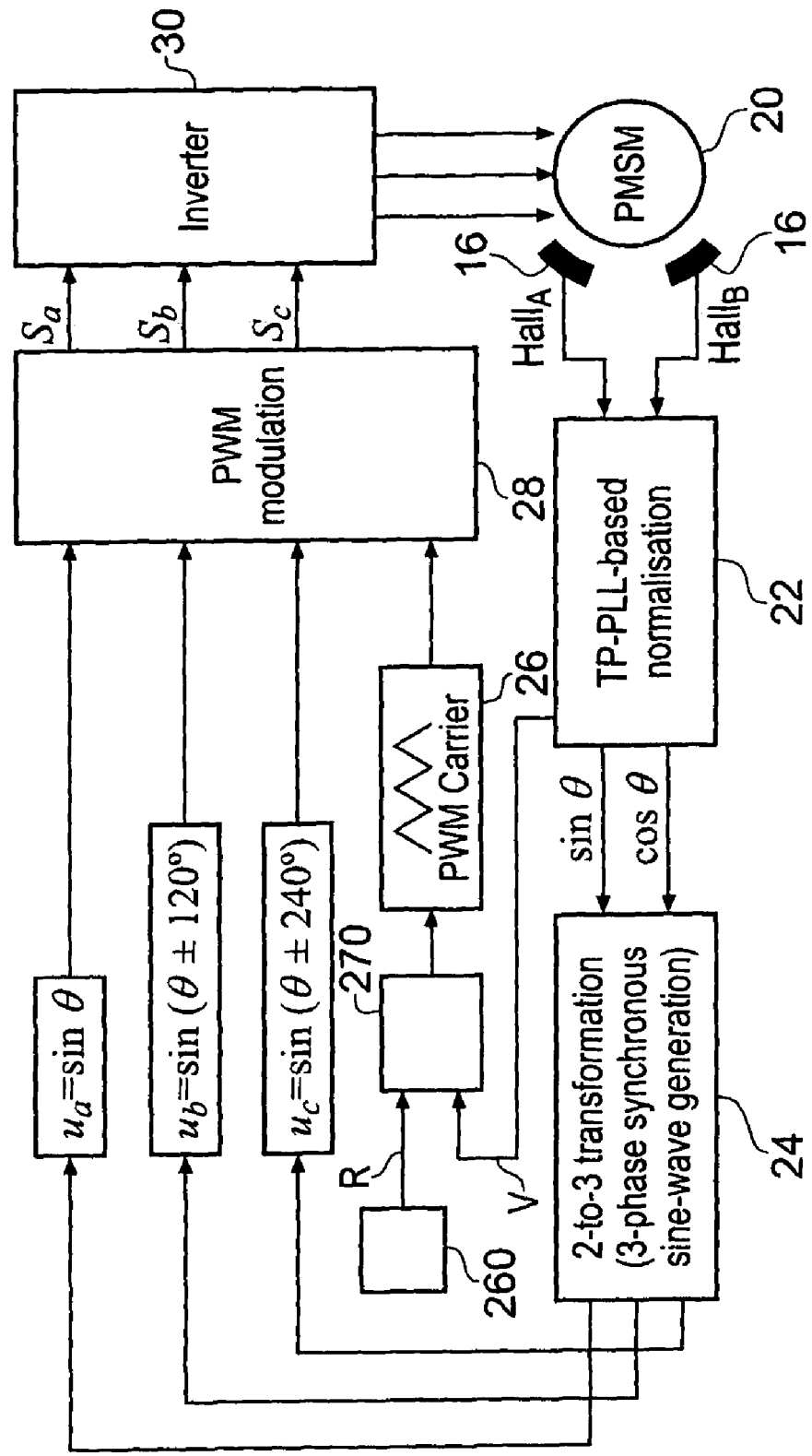
FIG. 13 is a schematic diagram of an closed-loop sine-wave drive, according to another embodiment of the invention, based on the output signals of two linear Hall sensors normalised by a Two Phase-Phase Locked Loop (TP-PLL).

FIG. 13 illustrates another embodiment of the invention, which uses closed loop control of a PMSM 20. The elements 16, 20, 22, 24, 26, 28 and 30 of FIG. 13 are identical to those of FIG. 1 and will not be further described here. The embodiment of FIG. 13 differs from that of FIG. 1 in that a feedback controller 270 is provided which compares a reference value R produced by a source 260 with an actual value V to be controlled. In this example the actual value may be θ or ω for the motor position or speed as produced by the TP-PLL of FIG. 6($a$).

An embodiment of the present invention may comprise a controller C shown by the dashed box C in FIG. 1 and which has inputs for connection to the Hall sensors 16 and to the source 260 and outputs Sa, Sb and Sc for connection to the inverter 30. Such a controller C may be implemented by a digital processor or MCU or by a hardwired circuit.

The invention may also be a computer program which when run on a suitable process causes the processor to operate as the controller C of FIG. 1.

As described above the Hall sensors 16 are spaced by 90 electrical degrees. However, they may be displaced at any other angle not equal to 180n where n is an integer, n=0, 1, 2 etc. If spaced at an angle not equal to 90 degrees a circuit 222 is provided as shown in FIG. 1 to derive from the outputs of the Hall sensors the components sin θ and cos θ.

As described above the Hall sensors sense the field of the excitation ring. However, the Hall sensors may sense the poles of the rotor.

As described above the magnetic sensors are linear Hall effect sensors. However other linear magnetic field sensors may be used.

What is claimed is:

1. A permanent magnet synchronous motor having a stator and a rotor, the stator having windings and the rotor comprising a plurality of permanent magnets, and a controller, the controller comprising:
two magnetic field sensors, each having a linear response to sensed magnetic field strength, the sensors being spaced by an angle A electrical degrees relative to the rotor, where angle A is greater than 0 degrees and less than 180 degrees or greater than 180 degrees and less than 360 degrees, for sensing the position of the rotor by sensing a magnetic field representative of the fields of the magnets of the rotor;
normalizing means for producing first and second signals representing normalized orthogonal components of the outputs of the sensors; and
energizing means for producing, from the said orthogonal components, sinusoidal currents for energizing the windings of the stator to drive the rotor, the energizing means including a transformer that transforms the normalized first and second signals into 3-phase synchronous sinusoidal waveforms;
wherein the normalizing means produces the first and second signals with a uniform amplitude.

2. The motor according to claim 1, wherein the angle A is not 90 degrees and wherein the said means for producing the first and second normalized orthogonal components comprises means for deriving, from the outputs of the sensors, two orthogonal components and means for normalizing the orthogonal components.

3. The motor according to claim 1, wherein the said angle A is about 90 degrees and wherein the said means for producing the first and second normalized orthogonal components comprises means for normalizing the orthogonal components.

4. The motor according to claim 2, wherein the normalizing means operates according to the equations $$H_{A\text{-}norm} = \frac{H_A}{\sqrt{H_A^2 + H_B^2}} \text{ and } H_{B\text{-}norm} = \frac{H_B}{\sqrt{H_A^2 + H_B^2}}$$

where $H_{norm}$ is the normalized value and $H_A$ and $H_B$ are the outputs of the magnetic field sensors.

5. The motor according to claim 3, wherein the normalising means operates according to the equations $$H_{A\text{-}norm} = \frac{H_A}{\sqrt{H_A^2 + H_B^2}} \text{ and } H_{B\text{-}norm} = \frac{H_B}{\sqrt{H_A^2 + H_B^2}}$$

where $H_{norm}$ is the normalized value and $H_A$ and $H_B$ are the outputs of the magnetic field sensors.

6. The motor according to claim 2, wherein the normalizing means comprises a two phase phase-locked-loop for unifying an amplitude of the first and second signals.

7. The motor according to claim 3, wherein the normalizing means comprises a two phase phase-locked-loop for unifying an amplitude of the first and second signals.

8. The motor according to claim 1, wherein the said sensors are arranged to sense the magnetic fields of the magnets of the rotor.

9. The motor according to claim 1, further comprising a ring fixed to rotate with the rotor and having a number of magnetic poles equal to the number of magnets of the rotor for indicating the positions of the magnets of the rotor, and wherein the sensors sense the magnetic fields of the poles of the ring.

10. The motor according to claim 9, wherein the ring provides a flux distribution substantially identical to that of the permanent magnets of the rotor.

11. The motor according to claim 9, wherein the poles of the ring are aligned with those of the rotor.

12. The motor according to claim 1, wherein the energizing means comprises means for producing a carrier waveform and means for comparing the carrier waveform with each of the three phases of the 3-phase synchronous sinusoidal waveforms to produce three pulse width modulated waveforms and means for converting the three pulse width modulated waveforms to corresponding sinusoids for energizing the stator.

13. The motor according to claim 12, further comprising means for varying the amplitude of the carrier waveform to vary the amplitude of the phases applied to the stator.

14. The motor according to claim 1, wherein the said magnetic sensors are Hall effect sensors, and the first and second signals are sine and cosine signals.

15. A controller for use with a permanent magnet synchronous motor having a stator and a rotor, the stator having windings and the rotor comprising a plurality of permanent magnets; the controller comprising;
inputs for connection to two magnetic field sensors, each having a linear response to sensed magnetic field strength, the sensors being spaced by an angle A electrical degrees relative to the rotor, where angle A is greater than 0 degrees and less than 180 degrees or greater than 180 degrees and less than 360 degrees, for sensing the position of the rotor by sensing a magnetic field representative of the fields of the magnets of the rotor;
means for producing first and second signals representing normalized orthogonal components of the outputs of the sensors; and
means for producing, from the said orthogonal components, pulse width modulated currents for application to an inverter for energizing the windings of the stator to drive the rotor the means for producing pulse width modulated currents including a transformer that transforms the normalized first and second signals into 3-phase synchronous sinusoidal waveforms;
wherein the normalizing means produces the first and second signals with a uniform amplitude.

16. The controller according to claim 15, wherein the energizing means comprises means for producing a carrier waveform and means for comparing the carrier waveform with each of the three phases of the 3-phase synchronous sinusoidal waveforms to produce three pulse width modulated waveforms and means for converting the three pulse width modulated waveforms to corresponding sinusoids for energizing the stator.

17. The controller according to claim 16, further comprising means for varying the amplitude of the carrier waveform to vary the amplitude of the phases to be applied to the stator.

* * * * *